(12) United States Patent
Rajewski

(10) Patent No.: US 6,547,964 B1
(45) Date of Patent: Apr. 15, 2003

(54) MUD TANK CLEANING SYSTEM

(76) Inventor: Robert C. Rajewski, R.R. #1, Donalda, Alberta (CA), T0B 1H0

( * ) Notice: Subject to any disclaimer, the term of this patent is extended or adjusted under 35 U.S.C. 154(b) by 0 days.

(21) Appl. No.: 09/656,624

(22) Filed: Sep. 7, 2000

Related U.S. Application Data

(60) Provisional application No. 60/152,817, filed on Sep. 8, 1999.

(51) Int. Cl.⁷ .................................................. B01D 21/04
(52) U.S. Cl. ........................ 210/241; 210/527; 210/536; 175/66
(58) Field of Search ................................ 210/241, 523, 210/527, 532.1, 536; 175/66, 206

(56) References Cited

U.S. PATENT DOCUMENTS

| 1,911,008 | A | * | 5/1933 | Withington | 210/527 |
|---|---|---|---|---|---|
| 2,006,825 | A | | 7/1935 | Downes | 210/3 |
| 2,085,150 | A | | 6/1937 | Gemeny | 210/3 |
| 2,916,148 | A | * | 12/1959 | Crane et al. | 210/527 |
| 3,410,412 | A | * | 11/1968 | Fechter | 210/527 |
| 3,498,466 | A | * | 3/1970 | Fechter et al. | 210/527 |
| 3,635,349 | A | * | 1/1972 | Weiss et al. | 210/527 |
| 3,920,558 | A | | 11/1975 | Lind et al. | 210/527 |
| 4,213,479 | A | * | 7/1980 | Pearson | 210/241 |
| 4,377,475 | A | * | 3/1983 | Wiedemann | 210/241 |
| 4,753,549 | A | | 6/1988 | Shook et al. | 404/75 |
| 4,761,039 | A | | 8/1988 | Hilaris | 299/39 |
| 4,816,167 | A | * | 3/1989 | Vanderslice | 210/241 |
| 5,016,717 | A | | 5/1991 | Simons et al. | 175/66 |
| 5,021,156 | A | * | 6/1991 | Sloan | 210/241 |
| 5,212,891 | A | | 5/1993 | Schuermann et al. | 37/62 |
| 5,425,188 | A | * | 6/1995 | Rinker | 175/206 |
| 5,503,753 | A | * | 4/1996 | Woodall et al. | 210/241 |
| 5,846,440 | A | | 12/1998 | Angelle | 210/803 |

FOREIGN PATENT DOCUMENTS

DE          2203865     *  8/1973

* cited by examiner

Primary Examiner—Christopher Upton

(57) ABSTRACT

A mud tank cleaning system, is formed from a mud tank having confining walls. An opening is provided in the confining walls of the mud tank. A removable cover is mounted on the mud tank over the opening. A sweep is mounted in the mud tank and is operable to sweep mud in the mud tank towards the opening in the confining walls. A sweep drive mechanism is operably connected to the sweep for operating the sweep. A hydrovac vehicle is formed of a frame mounted on wheels, a mud tank mounted on the frame, a water tank mounted on the frame, a water pump mounted on the frame and hydraulically connected to the water tank to pump water from the water tank for use in hydrovac operations, a blower mounted on the frame and connected by lines to the mud tank for removing fluids from the mud tank; and a boom line mounted on the mud tank for conveying fluidized materials to the mud tank. The mud tank and water tank share a common wall, and any one or more of the mud tank, water tank, blower and water pump are bolted directly to the frame.

8 Claims, 7 Drawing Sheets

MUD TANK CLEANING SYSTEM

CLAIM OF PRIORITY

Applicant hereby claims the benefit under 35 U.S.C. § 119(e) of U.S. provisional patent application No. 60/152,817, filed Sep. 8, 1999.

FIELD OF THE INVENTION

This invention relates to devices for cleaning out mud tanks of hydrovac units.

BACKGROUND OF THE INVENTION

In hydrovac operations water is used to blast a hole or trench in soil and the fluidized soil thus created is sucked into a mud tank. The water in the mud tank is filtered and recirculated for use in blasting the hole, while mud accumulates in the mud tank. Periodically, the mud has to be removed from the mud tank. In the past, removal of the mud has been done with hoists, in which the tank is lifted and the mud dumped. This is not efficient, and the resulting vehicle is fairly complex.

SUMMARY OF THE INVENTION

The inventor has proposed a solution to the inefficient removal of mud from a mud tank. There is therefore provided in accordance with an embodiment of the invention, a mud tank cleaning system, comprising:

a mud tank having confining walls;

an opening in the confining walls of the mud tank;

a removable cover mounted on the mud tank over the opening;

a sweep mounted in the mud tank and being operable to sweep mud in the mud tank towards the opening in the confining walls; and a sweep drive mechanism operably connected to the sweep for operating the sweep.

According to a further aspect of the invention, there is provided a hydrovac vehicle, comprising a frame mounted on wheels, a mud tank mounted on the frame, a water tank mounted on the frame, a water pump mounted on the frame and hydraulically connected to the water tank to pump water from the water tank for use in hydrovac operations, a blower mounted on the frame and connected by lines to the mud tank for removing fluids from the mud tank; and a boom line mounted on the mud tank for conveying fluidized materials to the mud tank.

Preferably, the mud tank is formed of a cylindrical wall and domed end walls, and the sweep is pivotally mounted from a wall forming a roof for the mud tank. Both the sweep drive and the removable cover for the opening are preferably hydraulically operated. Preferably, the sweep comprises a sweep arm terminating in a sweep blade, with the sweep blade mounted pivotally on the sweep arm to allow the sweep blade to swing free of mud in the mud tank when the sweep blade is moved away from the opening. The sweep blade is preferably smaller than the opening, and the sweep blade is mounted to sweep through the opening upon operation of the sweep drive mechanism.

According to other aspects of the invention, the mud tank and water tank share a common wall, and any one or more of the mud tank, water tank, blower and water pump are bolted directly to the frame. In a still further aspect of the invention, the boom line is mounted on the mud tank.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, "comprising" means "including". In addition, a reference to an element by the indefinite article "a" does not exclude the possibility that more than one of the elements is present.

Figure 1:
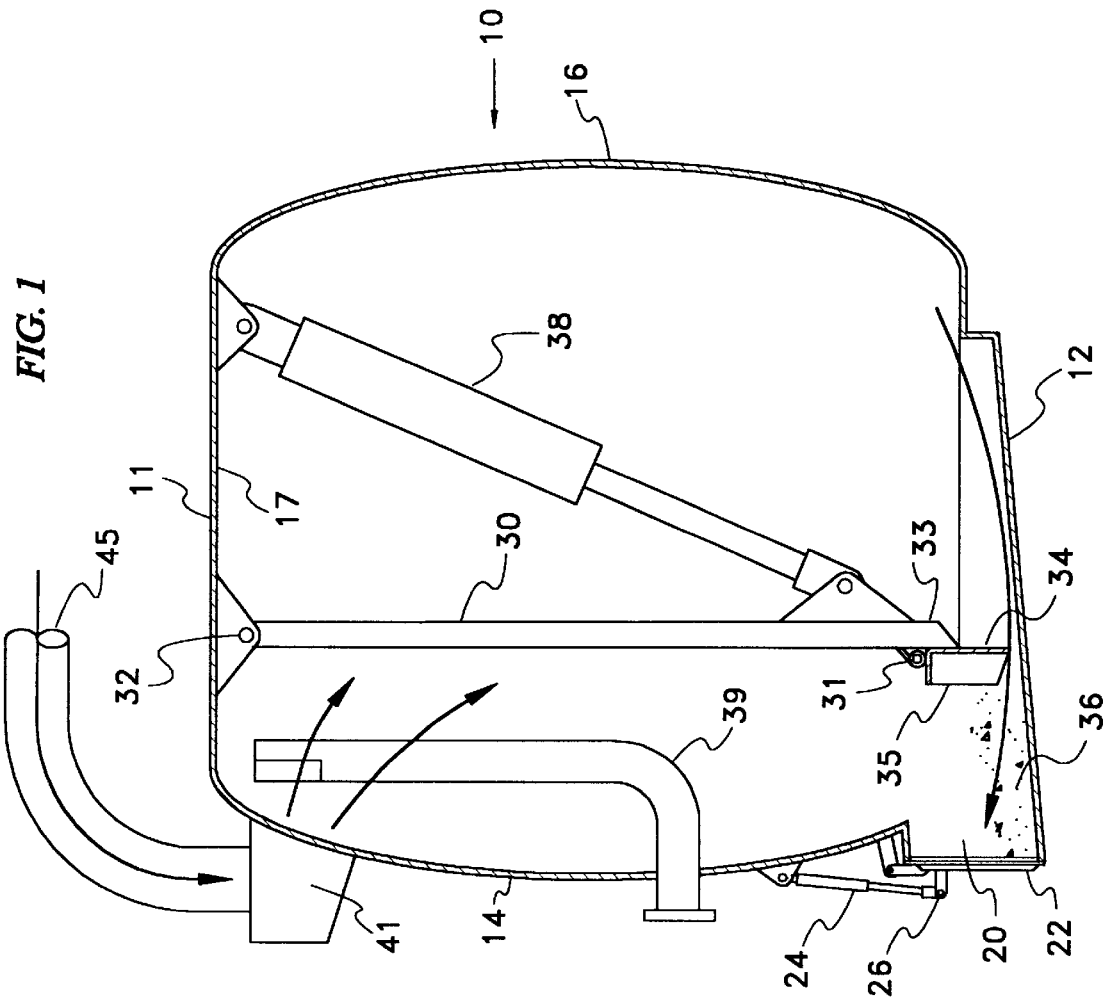
FIG. 1 is a side view schematic of a mud tank according to the invention.
Figure 2:
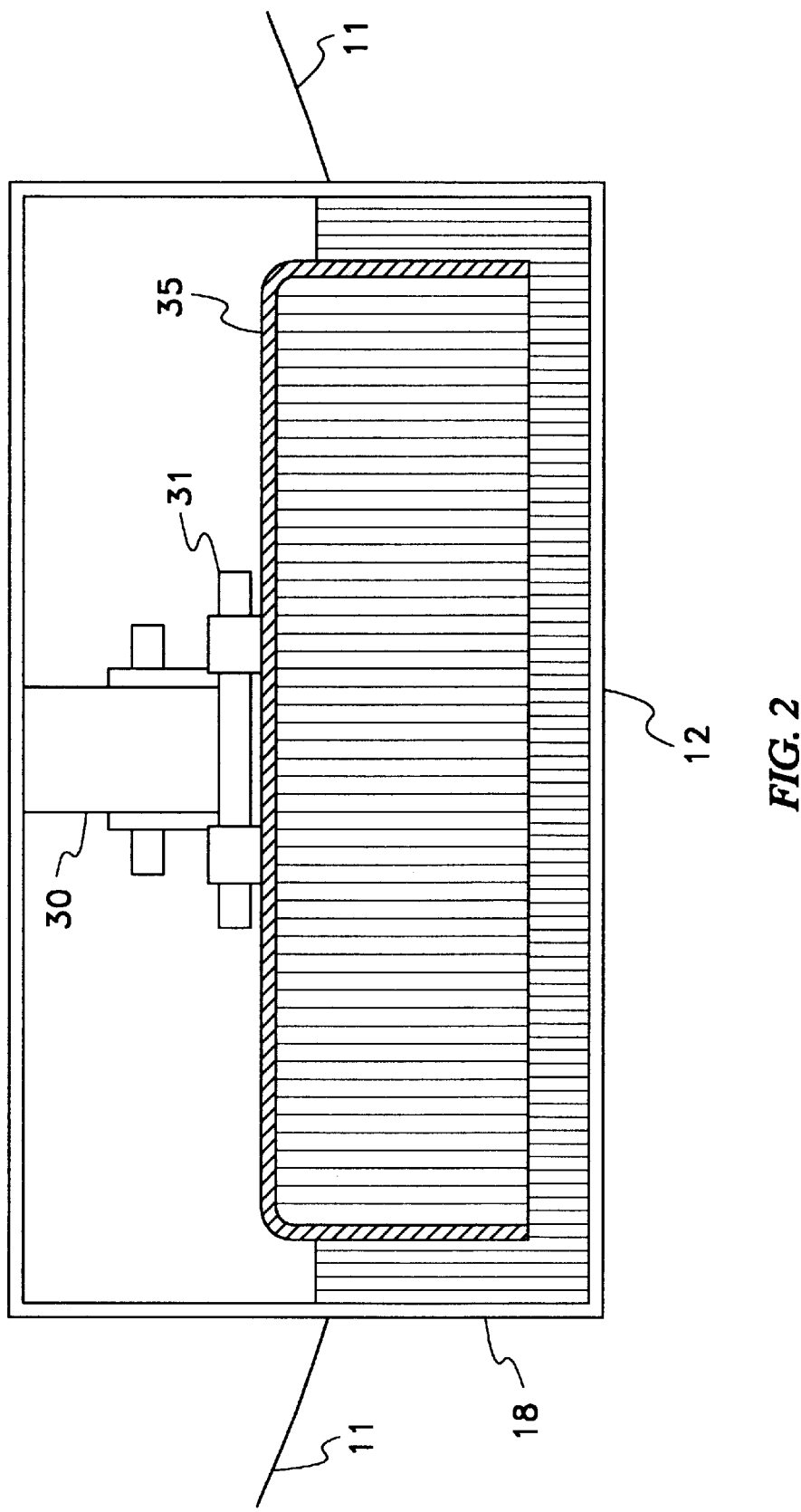
FIG. 2 is a front view of a mud tank according to the invention.
Figure 3:
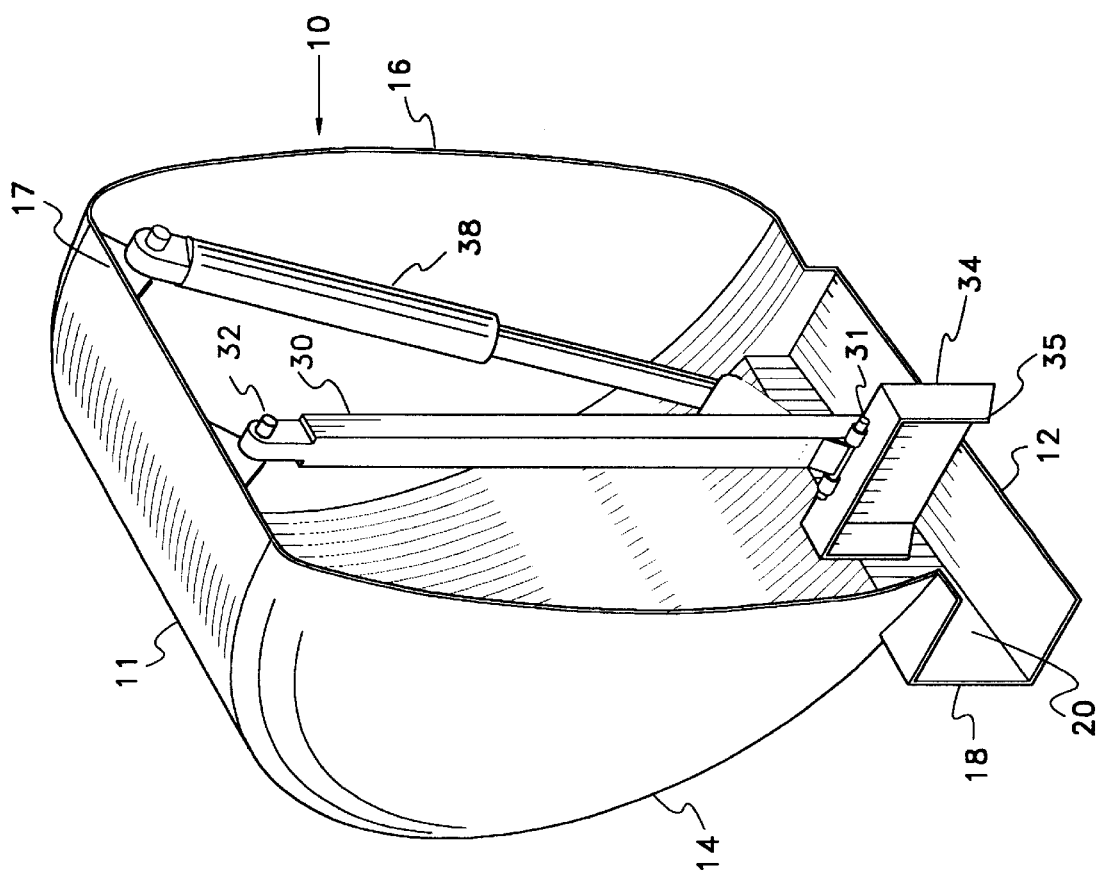
FIG. 3 is a perspective view of a mud tank according to the invention.

A mud tank cleaning system is shown in FIGS. 1, 2, 3 and 4. FIGS. 1, 2 and 3 show details of the mud tank 10. The mud tank 10 is formed of confining walls 11, 14 and 16. The mud tank 10 preferably has a cylindrical wall 11 with a depressed lower part 12, with domed access wall 14 and domed end wall 16. The lower part 12 forms a trough extending from near the end wall 16 to and beyond the access wall 14. The trough 12 deepens from end wall 16 to the access wall 14, and has near vertical side walls 18. The trough 12 extends through a rectangular opening 20 partly in the access wall 14 and partly in the lower part of the cylindrical wall 11. The orientation of the trough 12 could be in any direction that was suitable for dumping mud from the tank 10. The opening 20 could also be in any of the walls, for example entirely in the bottom wall. A removable cover 22 is mounted on the mud tank 10 over the opening 20, and operated by a conventional hydraulic cylinder 24 secured between the access wall 14 and a projecting arm 26 on the cover 22.

Figure 4:
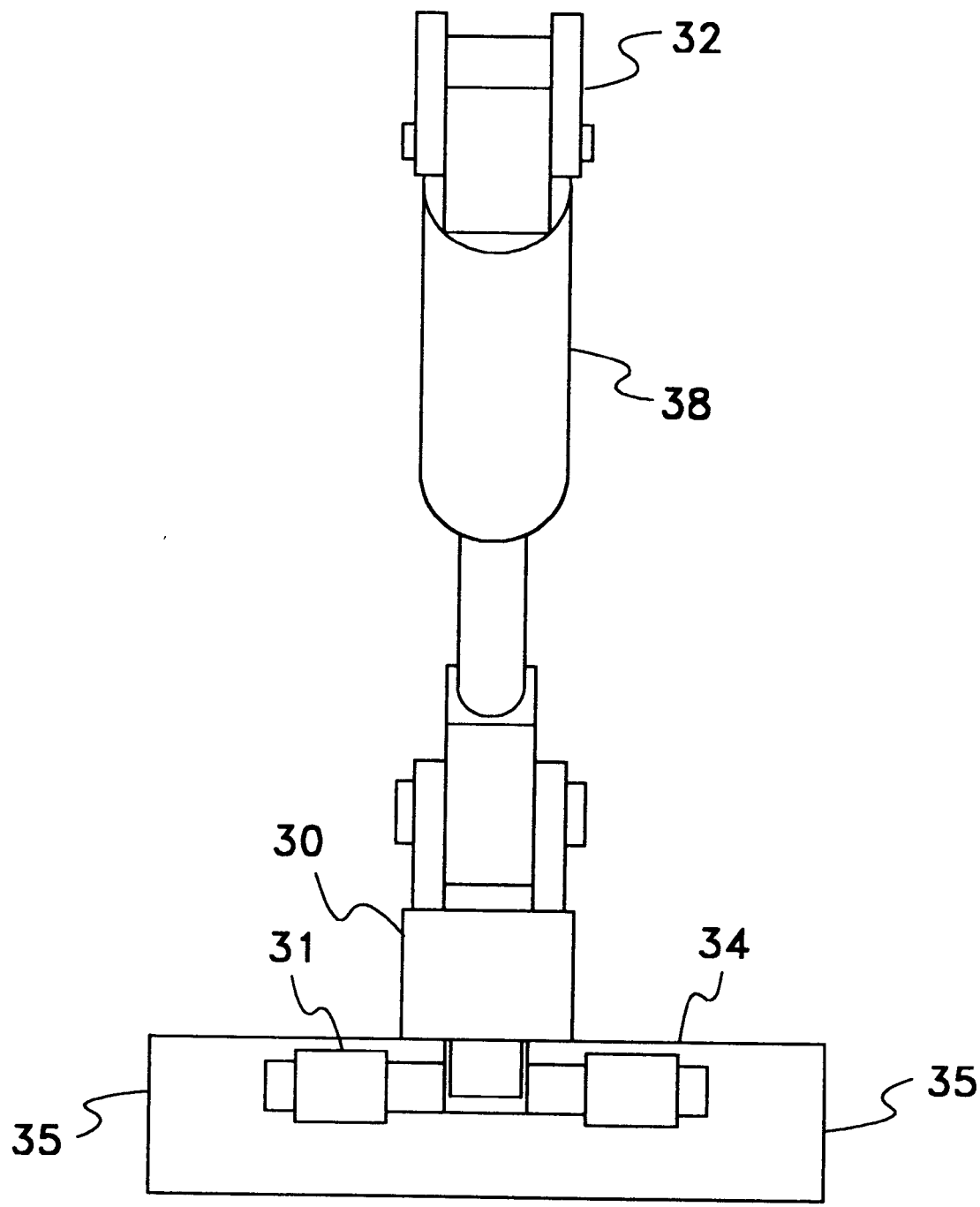
FIG. 4 is a top view of a drive mechanism for the mud tank sweep arm.

A sweep formed of a sweep arm 30 and sweeping blade 34 is mounted in the mud tank 10, for example as shown by being mounted to a pivot 32 fastened to the roof 17 of the mud tank 10. In operation, the sweep arm 30 pivots and its lower sweeping blade 34 moves in an arc along the trough 12 of the mud tank 10 towards the opening 20, thus being operable to sweep mud 36 in the mud tank 10 towards the opening 20 in the mud tank 10. The sweep arm 30 is provided with a sweep drive mechanism operably connected to the sweep arm 30 for causing the sweep arm 30 to move across the bottom 14 of the mud tank 10 towards the opening 20. The drive mechanism is preferably a hydraulic cylinder 38 secured to the sweep arm 30 and to the roof 17, as shown in FIG. 4. Fluid for the hydraulics shown in FIG. 1 is provided by a conventional hydraulic supply and control system. Preferably, the sweep blade 34 has approximately the same shape, and is slightly smaller than, the opening 20, and is concave facing the opening 20 to contain mud being swept across the bottom of the tank. The concavity of the sweep blade 34 is preferably provided by flanges 35. It is preferred that the sweep blade 34 be slightly smaller than the opening 20 since then it can fully enter the opening to force mud out of the mud tank 10. The sweep blade 34 is preferably attached to the sweep arm 30 using a pivot mount 31, above the bottom end of the sweep arm 30. The sweep blade will therefore pivot on the sweep arm 30. The sweep blade 34 is mounted pivotally on the sweep arm 30 to allow the sweep blade 34 to swing free of mud in the mud tank when the sweep blade is moved away from the opening, while pushing mud out of the opening on the forward swing towards the opening. The pivot mount 31 is located a short distance away from the downward extremity 33 of the sweep arm 30 to form a stop that prevents the blade 34 from pivoting out of the way of the mud on the forward swing when the sweep arm moves towards the opening 20. Top and side flanges 35 on the sweep blade 34 assist in collecting the mud and preventing it from spilling over the blade 34 as it is pushed towards the opening. Conventional materials are used for the all the elements shown.

As shown in FIG. 1, the mud tank also comprises a liquid load riser 39 and entrance port 41, both of which are for receiving the fluidized soil in the tank. Air and other vapors are suctioned out of the tank 10 through a vapor outlet port 43. An overhead boom line 45 can be used to transport fluidized soil to the entrance port 41. These components are known in the art and need not be further described here.

Figure 5:
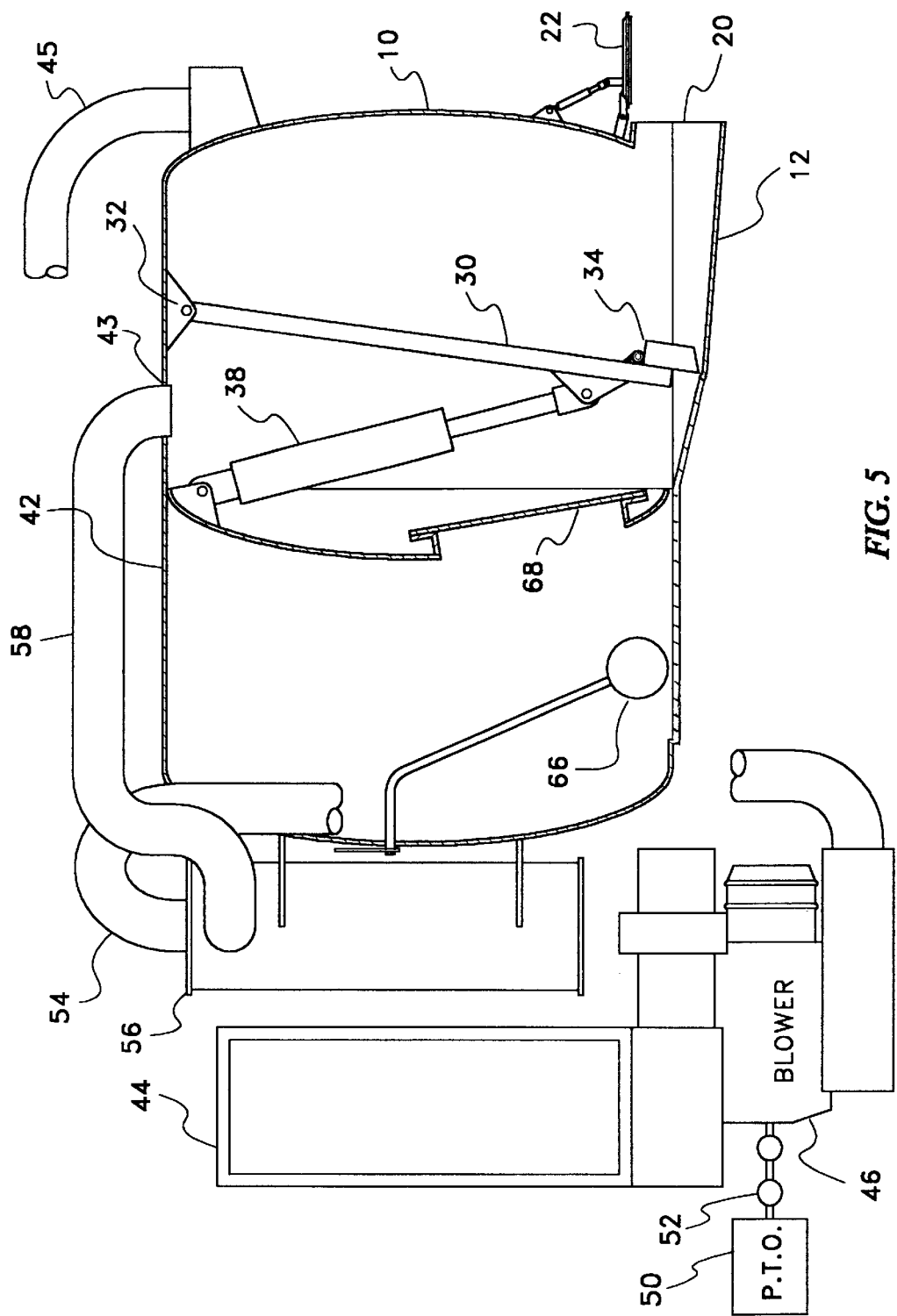
FIG. 5 is a left side view of a hydrovac unit incorporating a mud tank.
Figure 6:
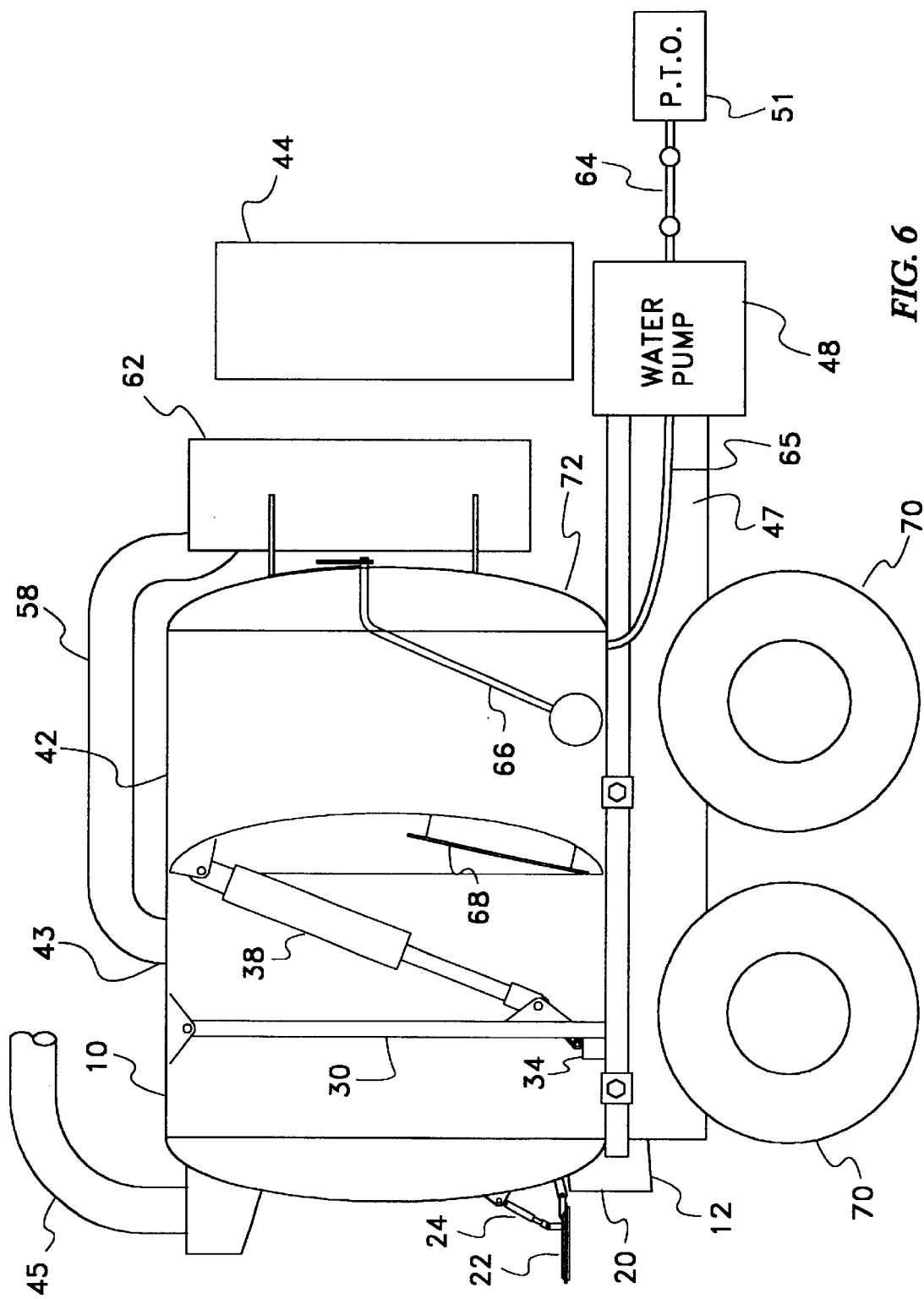
FIG. 6 is a right side view of a hydrovac unit incorporating a mud tank.
Figure 7:
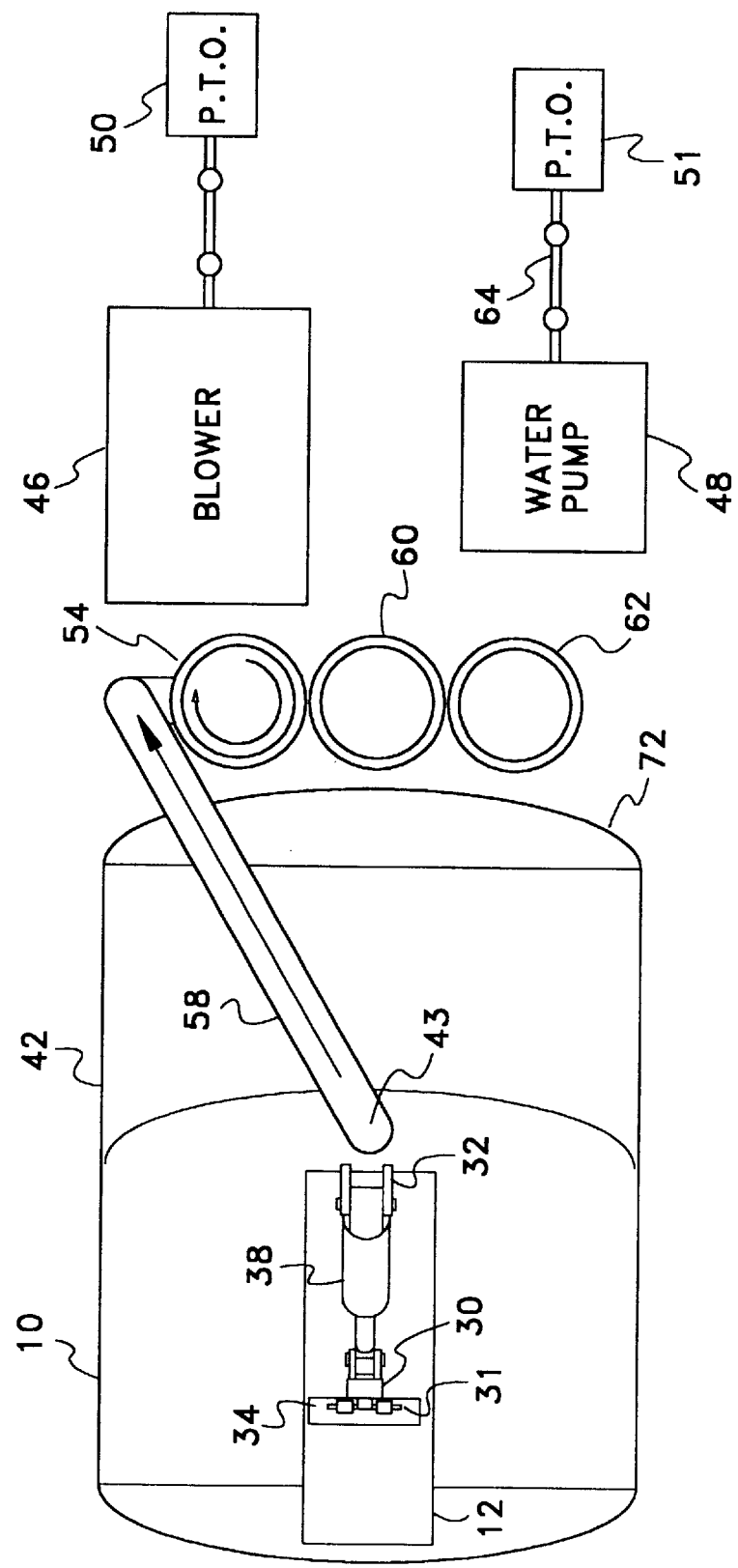
FIG. 7 is a top view of a hydrovac unit incorporating a mud tank.

The mud tank 10 in FIG. 1 is shown in FIGS. 5, 6 and 7 combination with a hydrovac vehicle 40 with water tank 42, and mechanical storage 44, having a blower 46, water pump 48 and power take offs 50, 51 from an engine (not shown). The water tank 42 is preferably formed of a cylinder welded to the end wall 16 of the mud tank 10 and closed at the opposite end by a water tank end wall 72, thus forming a combination mud/water tank with an intervening divider, the end wall 16. The mud tank 10 and water tank 42 are bolted directly to the fame 47 of the hydrovac vehicle 40.

The blower 46 is bolted directly to the left side of the frame 47 of the hydrovac vehicle 40 forward of the water tank 42, and is connected directly by a drive shaft 52 to the power take off 50. The blower 46 sucks air through a conventional cyclone separator 54 through line 56. The cyclone separator 54 is connected by suction line 58 to the outlet 43 from the mud tank 10. Operation of the blower 46 sucks air out of the mud tank 10 into the cyclone separator 54. A cooling air silencer 60 and discharge air silencer 62 are also provided on the hydrovac vehicle 40.

Water pump 48 is bolted to the frame 47 of the hydrovac vehicle 40 in front of the water tank 42, and is connected directly to power take off 51 by direct drive shaft 64. Water pump 48 pumps water out of the tank 42 for use in the hydrovac digging operation through hose 65 and other conventional hoses (not shown). The water tank 42 is also provided with a water level indicator 66 and access port 68. The hydrovac vehicle 40, water tank 42, mechanical storage 44, blower 46, water tank 48, power take offs 50, 51, cyclone 54, silencers 60, 62 and their associated connections are all conventional. On the other hand, it is believed to be new to mount the water pump 48 and blower 46 directly to the frame 47 of the hydrovac vehicle where they are readily accessible for direct drive straight to the PTO 50, 51 for operation and maintenance. The hydrovac vehicle 40 is preferably a truck mounted on wheels 70.

The hydrovac vehicle 40 has fewer moving parts and components that make it economical to build and allows for fewer breakdowns. The modular design allows the blower 46 and water pump 48 to be mounted on the frame 47 low down so that the drive shafts from the power take offs 50, 51 are short and simple. The combination mud/water tank has few moving parts and components, and the boom 45 may be mounted directly to the end of the mud tank 10. Use of the reciprocating sweep allows the mud tank to be bolted directly to the frame, and thus allows the hydrovac vehicle to be kept simple with few moving parts. Although a preferred pivotally mounted sweep is shown, the sweep may be mounted in various ways to produce a sweeping action, including by being mounted on a reciprocating ram.

Immaterial modifications may be made to the invention described here without departing from the essence of the invention.

I claim:

1. A mud tank cleaning system, comprising:

a mud tank having confining walls;

an opening in the confining walls of the mud tank;

a removable cover mounted on the mud tank over the opening;

a sweep mounted in the mud tank and being operable to sweep mud in the mud tank towards the opening in the confining walls;

a sweep drive mechanism operably connected to the sweep for operating the sweep; and wherein the sweep is pivotally mounted from a wall forming a roof for the mud tank.

2. The mud tank cleaning system of claim 1 in combination with a hydrovac vehicle.

3. A hydrovac vehicle having a frame mounted on wheels, a mud tank mounted on the frame, a water tank mounted on the frame, a water pump mounted on the frame and hydraulically connected to the water tank to pump water from the water tank for use in hydrovac operations, a blower mounted on the frame and connected by lines to the mud tank for removing fluids from the mud tank, and a boom line mounted on the mud tank for conveying fluidized materials to the mud tank, the mud tank comprising:

confining walls;

an opening in the confining walls of the mud tank;

a removable cover mounted on the mud tank over the opening;

a sweep mounted in the mud tank and having an upwardly extending sweep arm, the sweep being operable to sweep mud in the mud tank towards the opening in the confining walls; and a sweep drive mechanism operably connected to the sweep for operating the sweep.

4. The hydrovac vehicle of claim 3 in which the sweep is pivotally mounted in the mud tank.

5. The hydrovac vehicle of claim 4 in which the sweep is pivotally mounted from a wall forming a roof for the mud tank.

6. The hydrovac vehicle of claim 3 in which the sweep arm terminates in a sweep blade.

7. The hydrovac vehicle of claim 6 in which the sweep blade is mounted pivotally on the sweep arm to allow the sweep blade to swing free of mud in the mud tank when the sweep blade is moved away from the opening.

8. The hydrovac vehicle of claim 7 in which the sweep blade is smaller than the opening, and the sweep blade is mounted to sweep through the opening upon operation of the sweep drive mechanism.

* * * * *